March 30, 1937. W. M. JOLLY 2,075,582
FLOAT VALVE
Filed July 10, 1936  2 Sheets-Sheet 1

Inventor
William M. Jolly
By Clarence A. O'Brien
Hyman Berman
Attorneys

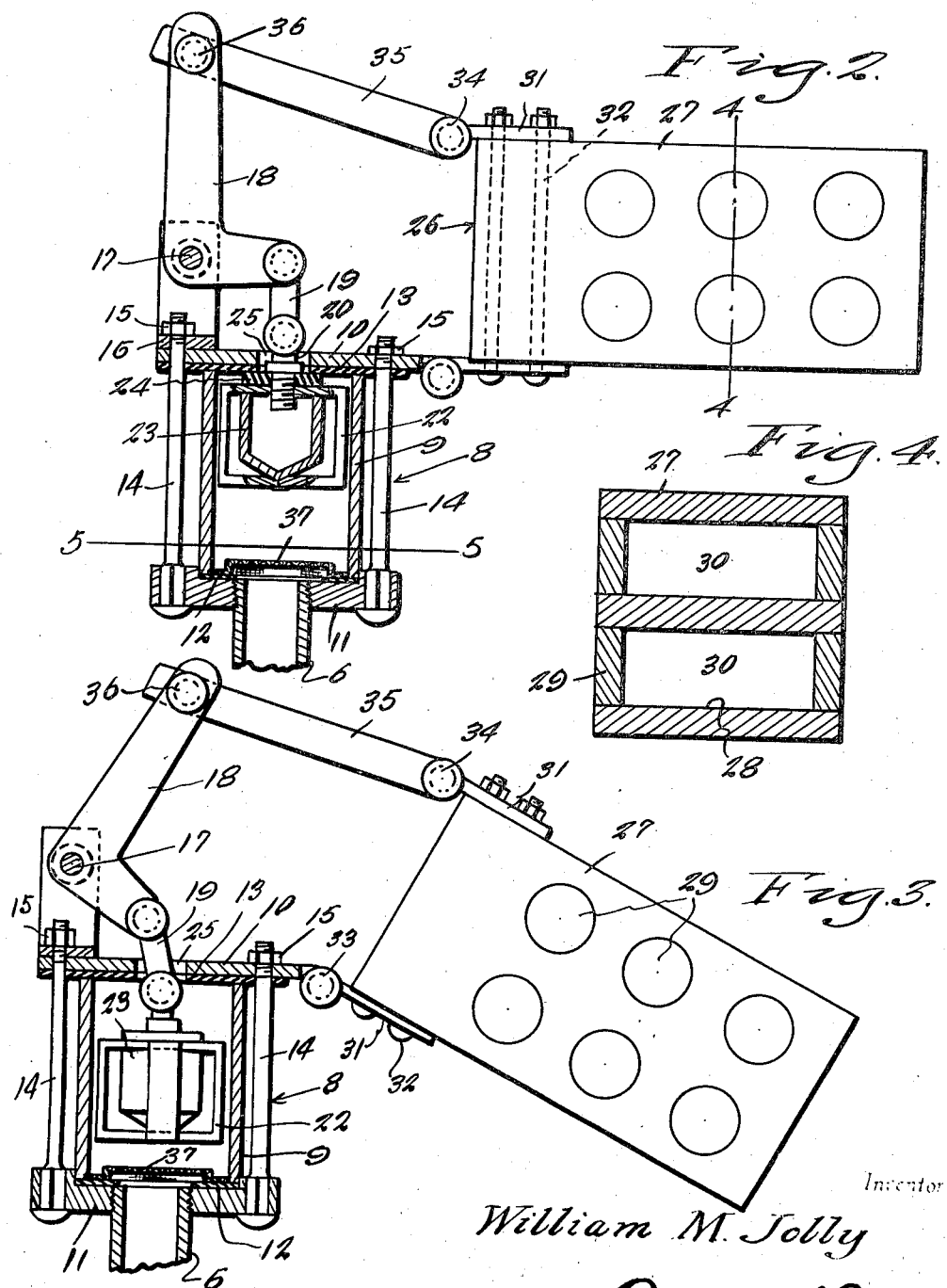

Patented Mar. 30, 1937

2,075,582

UNITED STATES PATENT OFFICE 2,075,582

FLOAT VALVE

William M. Jolly, Van Horn, Tex.

Application July 10, 1936, Serial No. 89,992

2 Claims. (Cl. 137—104)

This invention appertains to new and useful improvements in float valves especially adapted for use in drinking troughs for live stock.

The principal object of the present invention is to provide a float valve structure of the character stated which will be positive acting and not susceptible to the ready development of defects such as occur in present day types of float valves.

Another important object of the invention is to provide a float valve structure of the character stated wherein friction is reduced to a minimum thus reducing wear and other defects which occur from close fitting parts under immersed conditions.

These and various other important objects and advantages of the invention will become apparent to the reader of the following specification.

In the drawings:—

Figure 1 represents a vertical sectional view through a watering trough showing the float valve in side elevation.

Figure 2 is a vertical sectional view through the valve structure showing the float and associated details in elevation.

Figure 3 is a vertical sectional view similar to that as shown in Figure 2, but showing the float in partly lowered position.

Figure 4:
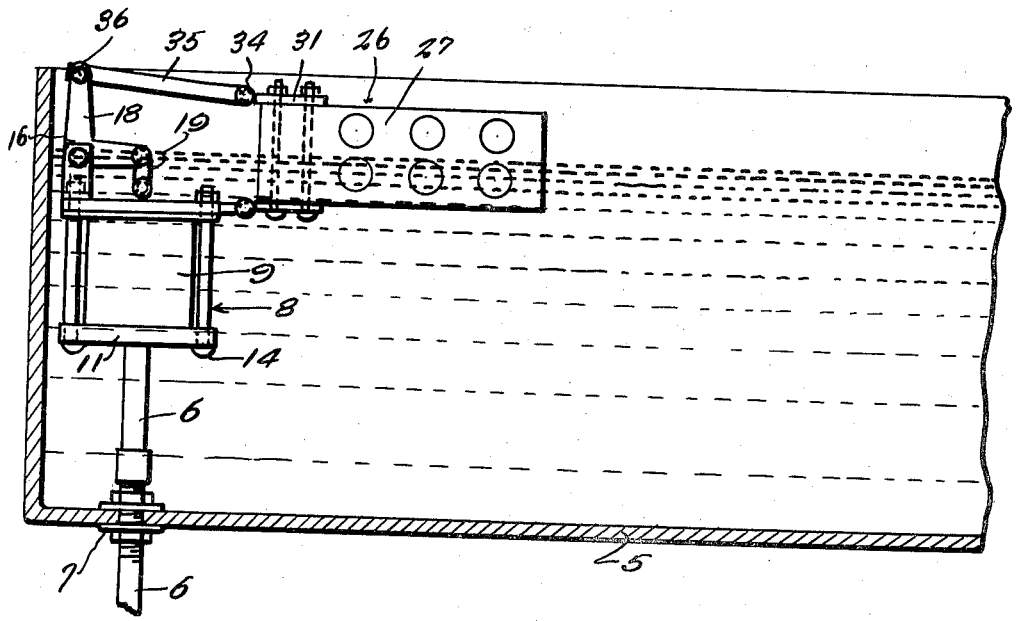
Figure 4 is a section on line 4—4 of Figure 2.

Referring to drawings wherein like numerals designate like parts, it can be seen in Figure 1 that numeral 5 represents the trough with numeral 6 the water supply pipe extending upwardly through the bottom thereof and suitably packed as at 7. Numeral 8 generally refers to the valve structure which consists of the cylindrical shell 9 clamped between the two headers 10 and 11. The lower header 11 has a recess 12 therein upon which a suitable packing gasket is placed and against which the lower end of the shell 9 engages while the upper end of the shell engages against the packing plate 13. Bolt members 14 extend upwardly through openings in the header 11 and pass through the header 10 where they are equipped with nuts 15. One or more of these bolts 14 pass upwardly through the lower portion of the U-shaped bracket 16 through the leg portions of which extends the pin 17, which pin also extends through the bell crank 18. The lower end of the bell crank 18 is connected by the pivotal link 19 to the threaded shank 20 which is screw threaded into the threaded opening 21 of the cage 22 which contains the valve body 23. Upon the cage 22 is the resilient valve plate 24 which is adapted to close off the outlet opening 25 in the header 10 when the float generally referred to by numeral 26 is in elevated position. When the float 26 lowers to the position shown in Figure 3 or lower, the water is free to pass through the opening 25. The water actually passes through and around the cage 22 to reach the opening 25. The float 26 consists of a block 27 of wood which is preferably bored through as at 28 at various points so as to lighten the float and the ends of these bores are plugged as at 29 thus leaving air spaces 30. Plates 31 are bolted as at 32 to one end of the float block 27 and one of these plates 31 is hingedly connected as at 33 to the upper header 10 while the other plate 31 is hingedly connected as at 34 to the arm 35 which in turn is pivotally connected as at 36 to the upper end of the bell crank 18.

Figure 5:
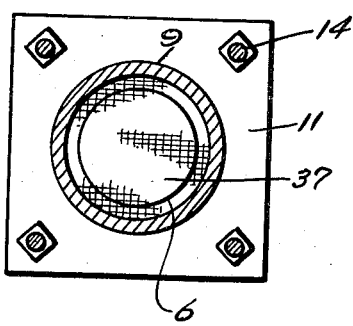
Figure 5 is a horizontal sectional view taken substantially on line 5—5 of Figure 2.
Figure 6:
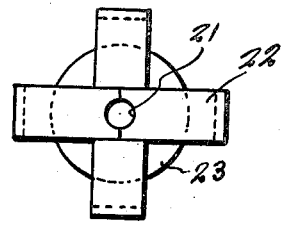
Figure 6 is a top plan view of the valve element.

It is possible that a small strainer 37 be placed over the discharge end of the supply pipe 6 as shown in Figures 2 and 5.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed is:—

1. A float of the character described comprising a block of wood provided with bores driven therethrough and plug elements driven into the block to close the ends of the bores.

2. In a float valve construction a valve seat plate, a valve operating member movable through the plate, a bracket mounted on the plate, a bell crank rockably supported by the bracket and having its lower end attached to the valve operating member, an elongated float member, a hinge plate secured to the top and bottom sides of the float, a link between the upper end of the bell crank and the upper hinge plate on the float, and a hinging connection between the lower hinge plate and one end of the valve seat plate.

WILLIAM M. JOLLY.